Patented Nov. 1, 1938

2,135,456

UNITED STATES PATENT OFFICE 2,135,456

SEPARATION OF CONSTITUENTS FROM AN ORGANIC COMPLEX

Donald J. Loder, Wilmington, Del., assignor to E. I. du Pont de Nemours & Company, Wilmington, Del., a corporation of Delaware No Drawing. Application December 13, 1935, Serial No. 54,328

21 Claims. (Cl. 260—540)

This invention relates to an improvement in the use of boron-halogen-containing compounds and more particularly to the separation of organic compounds from association with boron-halogen-containing compounds.

An object of the present invention is to provide an improved process for separating compounds from boron-halogen-containing condensing agents. Another object of the invention is to provide an improved process for utilizing boron-halogen-containing condensing agents wherein substantially no decomposition of the boron-halogen-containing condensing agent occurs throughout the reaction. A further object of the invention is to provide a means of preventing the decomposition of hydrated boron fluoride condensing agents by maintaining a definite ratio of the water to the boron-halogen-containing compound. Yet another object of the invention is to prevent the loss by decomposition of boron fluoride from a hydrate thereof when subjecting a solution containing it to distillation by continuously or intermittently adding water during the distillation to maintain the water to boron fluoride ratio at such a point that substantially no decomposition of boron fluoride results. Other objects and advantages of the invention will hereinafter appear.

The above and other objects of the invention will be realized by preventing the decomposition of boron-halogen-containing compounds associated with water which tend to decompose from hydrolysis or other cause. I have found that these compounds or complexes can be maintained in a substantially stable form if the ratio of water to the boron-halogen compound be held at a satisfactory value.

Hydrated-boron-halogen containing compounds have been suggested for many reactions involving condensation, polymerization, esterification, hydration, distillation and the like and in many such uses considerable difficulty has been encountered due to the facility with which the hydrated boron halogen compounds decomposed. This is particularly true of the hydrated forms of boron trifluoride which decompose, generally by hydrolysis to hydrogen fluoride and other products.

The hydrated boron fluoride as well as the other volatile boron-halogen-containing compounds associated with water can be maintained in the stable form without substantial decomposition or formation of halogen-containing hydrolysis products or loss from other causes if the water present combined with the boron fluoride or other boron-halogen-containing compound is maintained at the proper value. For example, I have determined that at atmospheric pressure if the water to boron fluoride ratio is allowed to fall below 2.3 to 2.5 mols of water per mol of boron trifluoride decomposition will result. To prevent this it is necessary to maintain the water to boron fluoride ratio at preferably higher than approximately 2.3 to 1. The water may be added intermittently, or continuously as desired, throughout the reaction or process,—the type of reaction or process being carried out determining in large measure the method of addition. It likewise may be added in sufficent amounts when the reaction is initiated in order that throughout the reaction or process the ratio is maintained above approximately 2.3 to 2.5 mols of water per mol of boron fluoride.

The ratio of 2.3 to 2.5 mols of water per mol of boron fluoride is necessary if decomposition is to be inhibited under atmospheric pressure conditions. When distillation or reaction in the presence of the water-boron fluoride complex is to be conducted under super- or sub-atmospheric pressures it will be found that lower ratios may be used at subatmospheric pressures with higher ratios at superatmospheric pressures.

The boron-halogen-containing condensing agents which may be protected in this manner include the fluorine, chlorine, bromine and iodine compounds of boron when used combined, mixed, or dissolved in water as a complex, compound, mixture or solution or otherwise associated therewith. In general the oxygenated acids obtained from mixtures of hydrochloric, hydrofluoric and hydrobromic acids with boric acid or borates, such, for example, as dihydroxyfluoboric acid, borofluohydric acid, and the like, may be so protected. It is not essential that these condensing agents be used alone, for promoters such as powdered nickel, nickel oxide, mercury oxide, etc., may be present with them.

The following examples will illustrate methods of practicing the invention although the invention is not limited to the details therein given:

*Example 1.*—Into a silver lined pressure shaker tube 2 mols of a water-boron fluoride addition compound containing one mol of water per mol of boron fluoride was charged and ethylene added at cylinder pressure of from 900 to 1000 pounds per square inch. The temperature was raised from room temperature to from 120 to 150° C., and the reaction continued until one mol of ethylene had been absorbed. A carbon monoxide pressure of 600 to 900 atmospheres was then superimposed on the olefine pressure and the reaction mixture heated to 175 to 185° C., for a period of approximately 30 minutes. The shaker tube was cooled and discharged and the reaction mixture heated whereupon boron fluoride, equivalent to approximately one-half a mol, was driven off. Steam was then injected into the mixture and an aqueous propionic acid condensate was obtained having approximately a 70% strength of the acid. A crude residue remained containing a water-boron fluoride addition compound having from 2.3 to 2.5 mols of water per mol of boron trifluoride. The one-half a mol of boron trifluoride liberated on the first heating of the crude product is combined with the residue after the removal of the aqueous propionic acid. This boron fluoride water addition compound may again be recycled with the ethylene for the preparation of subsequent batches of propionic acid.

*Example 2.*—Into a silver lined autoclave, provided with a rocker mechanism, was charged one mol methanol and one mol of a water-boron fluoride mixture or compound of the empirical formula $(HOH)_2.BF_3$. Carbon monoxide was admitted to the autoclave and the temperature raised to 250°. The temperature was maintained at 250° and the pressure at 900 atmospheres for 75 minutes. The autoclave was cooled and the processed batch discharged and distilled. During distillation the head temperature was kept below 120°, by controlled continuous addition of water to the still pot. 71% of the methanol was recovered as 69% aqueous acetic acid. The residue contained water and boron fluoride in the ratio of 2.5 to 1.0 together with a small amount of acetic acid. Methanol may if desired be added to the residue and the mixture recycled.

*Example 3.*—Into a silver lined autoclave of the type described in Example 2, was charged one mol methanol and one mol of a mixture or compound of the empirical formula $(HOH)_3.BF_3$. The pressure was raised to 900 atmospheres with carbon monoxide and the temperature to 260°. After processing for 35 minutes the charge was withdrawn and distilled. Methyl acetate equivalent to 54% of the methanol was distilled from the batch, after which water was added intermittently and an aqueous solution of acetic acid withdrawn, equivalent to 22% of the methanol. The residue contained water and boron fluoride in the ratio of 2.8 to 1.

*Example 4.*—Into a silver lined autoclave of the type described in Example 2, was charged one mol of a mixture of compound of the empirical formula $CH_3OCH_3.BF_3$ and 2.5 mols water. This charge was processed with carbon monoxide at 250° C. and 900 atmospheres pressure for 60 minutes. After discharging the batch was distilled. 32% of the dimethyl ether was recovered as methyl acetate. By means of continuous water injection, maintaining head temperature at 120° or below, 57% of the dimethyl ether was recovered as an 89% aqueous solution of acetic acid. The residue contained water and boron fluoride in the ratio of approximately 2.5 to 1.0. In it may be dissolved dimethyl ether for the next cycle.

*Example 5.*—A charge consisting of 231 parts of a mixture with the empirical formula $CH_3OCH_3.BF_3.(H_2O)_{2.5}$ was processed in an agitated autoclave for 30 minutes at 250° under 850 atmospheres pressure of carbon monoxide. The 293 parts of discharged product were distilled to remove 34 parts free methyl acetate. 39 parts of water were then injected in a continuous manner while 111 parts of an 89% acetic acid solution in water was recovered. The residue contained $BF_3$ and $H_2O$ in the approximate ratio of 1 to 2.5.

It will be noted in Example 2 that water is added continuously throughout the distillation steps in order to maintain the ratio of water to boron trifluoride at better than 2.5 water to 1 boron trifluoride, on the molal basis, the water may be added as described in the example or may if desired be added in one batch prior to the distillation, intermittently throughout the distillation or continuously in an amount sufficient to counter-balance the water lost by distillation. If, on the other hand, no water is added during the distillation, a point will be reached in which ratio of water to boron trifluoride falls below approximately 2.3 water to 1 boron fluoride whereupon free hydrogen fluoride will come over to be found later in the distillate. The presence of this contaminating substance in the finished product is, of course, highly undesirable.

From a consideration of the above specification it will be appreciated that many changes may be made in the details therein given without departing from the invention or sacrificing any of the advantages that may be derived therefrom.

I claim:

1. In a process involving the recovery of a distillable organic product from its solution with a boron-halogen-containing compound associated with water under conditions at which dehydration of the association occurs the step which comprises maintaining the ratio of water to the boron-halogen-containing compound at a value which will prevent the formation of halogen-containing hydrolysis products during the recovery of the organic product.

2. In a process involving the recovery of a distillable organic product from its solution with boron fluoride associated with water under conditions at which dehydration of the association occurs the step which comprises maintaining the ratio of water to the boron fluoride at a value which will prevent the formation of fluorine containing hydrolysis products during the recovery of the organic product.

3. In a process for the recovery of an organic acid, which is vaporized without decomposition, from its solution with a boron-halogen-containing compound associated with water the step which comprises removing the organic acid by distillation while continuously adding steam to the mixture undergoing distillation at a rate substantially equal to the rate at which water is distilled over with the acid.

4. In a process for the recovery of acetic acid from its solution with boron fluoride associated with water the step which comprises removing the acetic acid by distillation while continuously adding steam to the mixture undergoing distillation at a rate substantially equal to the rate water is distilled over with the acid.

5. In a process for the recovery of propionic acid from its solution with boron fluoride associated with water the step which comprises removing the propionic acid by distillation while continuously adding steam to the mixture undergoing distillation at a rate substantially equal to the rate water is distilled over with the acid.

6. In catalytic organic synthesis reactions in which a water-boron halide addition compound is present and the product is an organic compound which boils below the boiling point of the addition compound, the step which comprises separating the low boiling material from the products by distillation while preventing decomposition of the addition compound by the addition of water.

7. In a catalytic organic synthesis reaction in which a water-boron halide addition compound is present and the product is an organic compound which boils below the boiling point of the addition compound the step which comprises separating the low boiling material from the product by distillation while adding water to the product undergoing distillation.

8. In a catalytic organic synthesis reaction in which a water-boron fluoride addition compound is present and the product is an organic compound which boils below the boiling point of the water-boron fluoride addition compound, the step which comprises separating the low boiling material from the product by distillation while preventing the decomposition of the water-boron fluoride addition compound by the addition of water to the product undergoing distillation.

9. In a process for the recovery of acetic acid from its solution with a water-boron fluoride complex containing at least 2.3 mols of water per mol of boron fluoride the step which comprises conducting the separation by distillation during which the ratio of water to boron fluoride is maintained at, at least, 2.3 mols of water per mol of boron fluoride.

10. In a process involving distillation and the use of a boron-fluorine compound associated with water the step which comprises maintaining the ratio of water to the boron-fluorine compound in amount sufficient to prevent distillation of the boron-fluorine compound.

11. In a reaction involving distillation and the use of boron fluoride associated with water the step which comprises adding water to the reaction undergoing distillation to compensate for the water removed by distillation.

12. In a distillation process for the recovery of an organic acid, which is vaporized without decomposition, from its solution with a boron fluorine compound associated with water the step which comprises removing the organic acid by distillation while adding water to replace the water which distills over with the acid.

13. In a process for the recovery of an organic acid, which is vaporized without decomposition from a solution containing it, boron fluoride and water the step which comprises removing the organic acid by distillation and preventing the distillation of the boron fluoride by the addition of water.

14. In a catalytic process of oxidation by means of carbon monoxide involving the use of a boron-fluorine compound associated with water, in which oxidation process decomposition of the compound results from loss of water, the step which comprises maintaining the ratio of water to boron-fluorine compound above the decomposition point of the association.

15. In a catalytic process of oxidation by means of carbon monoxide involving the use of boron fluoride associated with water, in a reaction mixture from which the boron fluoride will be driven off by prolonging heating, the step which comprises adding water to the mixture to maintain, on a molal basis, the ratio of water to boron fluoride at greater than approximately 2.3 to 1.

16. In a catalytic process of reacting ethylene with carbon monoxide involving the use of boron fluoride associated with water, under conditions at which dehydration of the association occurs, a step which comprises preventing the formation of fluorine containing hydrolysis products, by maintaining the ratio of water to boron fluoride at substantially 2.3 to 1.

17. In a catalytic process of reacting methanol with carbon monoxide involving the use of boron fluoride associated with water, under conditions at which dehydration of the association occurs, a step which comprises preventing the formation of fluorine containing hydrolysis products, by maintaining the ratio of water to boron fluoride at substantially 2.3 to 1.

18. A process for the separation of an organic acid from its complex with boron fluoride which comprises reacting the complex with water and subsequently separating the acetic acid from the resulting mixture.

19. A process for the separation of an aliphatic organic acid, distillable without decomposition from its complex with boron fluoride, which comprises reacting the organic acid-boron fluoride complex with water and subsequently removing the aliphatic organic acid, by distillation, from the resulting mixture.

20. A process for the recovery of an aliphatic organic acid from its solution with boron fluoride, which comprises conducting the separation by distillation, during which the ratio of water to boron fluoride in the distillate is maintained at at least 2.3 mols of water per mol of boron fluoride.

21. A process for the recovery of propionic acid from its solution with boron fluoride, which comprises conducting the separation by distillation, during which the ratio of water to boron fluoride is maintained at at least 2.3 mols of water per mol of boron fluoride.

DONALD J. LODER.

---

CERTIFICATE OF CORRECTION.

Patent No. 2,135,456.  November 1, 1938.

DONALD J. LODER.

It is hereby certified that error appears in the printed specification of the above numbered patent requiring correction as follows: Page 2, first column, line 2, for "185°C." read 180°C.; and that the said Letters Patent should be read with this correction therein that the same may conform to the record of the case in the Patent Office.

Signed and sealed this 20th day of December, A. D. 1938.

Henry Van Arsdale (Seal)  Acting Commissioner of Patents.

the addition compound by the addition of water.

7. In a catalytic organic synthesis reaction in which a water-boron halide addition compound is present and the product is an organic compound which boils below the boiling point of the addition compound the step which comprises separating the low boiling material from the product by distillation while adding water to the product undergoing distillation.

8. In a catalytic organic synthesis reaction in which a water-boron fluoride addition compound is present and the product is an organic compound which boils below the boiling point of the water-boron fluoride addition compound, the step which comprises separating the low boiling material from the product by distillation while preventing the decomposition of the water-boron fluoride addition compound by the addition of water to the product undergoing distillation.

9. In a process for the recovery of acetic acid from its solution with a water-boron fluoride complex containing at least 2.3 mols of water per mol of boron fluoride the step which comprises conducting the separation by distillation during which the ratio of water to boron fluoride is maintained at, at least, 2.3 mols of water per mol of boron fluoride.

10. In a process involving distillation and the use of a boron-fluorine compound associated with water the step which comprises maintaining the ratio of water to the boron-fluorine compound in amount sufficient to prevent distillation of the boron-fluorine compound.

11. In a reaction involving distillation and the use of boron fluoride associated with water the step which comprises adding water to the reaction undergoing distillation to compensate for the water removed by distillation.

12. In a distillation process for the recovery of an organic acid, which is vaporized without decomposition, from its solution with a boron fluorine compound associated with water the step which comprises removing the organic acid by distillation while adding water to replace the water which distills over with the acid.

13. In a process for the recovery of an organic acid, which is vaporized without decomposition from a solution containing it, boron fluoride and water the step which comprises removing the organic acid by distillation and preventing the distillation of the boron fluoride by the addition of water.

14. In a catalytic process of oxidation by means of carbon monoxide involving the use of a boron-fluorine compound associated with water, in which oxidation process decomposition of the compound results from loss of water, the step which comprises maintaining the ratio of water to boron-fluorine compound above the decomposition point of the association.

15. In a catalytic process of oxidation by means of carbon monoxide involving the use of boron fluoride associated with water, in a reaction mixture from which the boron fluoride will be driven off by prolonging heating, the step which comprises adding water to the mixture to maintain, on a molal basis, the ratio of water to boron fluoride at greater than approximately 2.3 to 1.

16. In a catalytic process of reacting ethylene with carbon monoxide involving the use of boron fluoride associated with water, under conditions at which dehydration of the association occurs, a step which comprises preventing the formation of fluorine containing hydrolysis products, by maintaining the ratio of water to boron fluoride at substantially 2.3 to 1.

17. In a catalytic process of reacting methanol with carbon monoxide involving the use of boron fluoride associated with water, under conditions at which dehydration of the association occurs, a step which comprises preventing the formation of fluorine containing hydrolysis products, by maintaining the ratio of water to boron fluoride at substantially 2.3 to 1.

18. A process for the separation of an organic acid from its complex with boron fluoride which comprises reacting the complex with water and subsequently separating the acetic acid from the resulting mixture.

19. A process for the separation of an aliphatic organic acid, distillable without decomposition from its complex with boron fluoride, which comprises reacting the organic acid-boron fluoride complex with water and subsequently removing the aliphatic organic acid, by distillation, from the resulting mixture.

20. A process for the recovery of an aliphatic organic acid from its solution with boron fluoride, which comprises conducting the separation by distillation, during which the ratio of water to boron fluoride in the distillate is maintained at at least 2.3 mols of water per mol of boron fluoride.

21. A process for the recovery of propionic acid from its solution with boron fluoride, which comprises conducting the separation by distillation, during which the ratio of water to boron fluoride is maintained at at least 2.3 mols of water per mol of boron fluoride.

DONALD J. LODER.

---

CERTIFICATE OF CORRECTION.

Patent No. 2,135,456. November 1, 1938.

DONALD J. LODER.

It is hereby certified that error appears in the printed specification of the above numbered patent requiring correction as follows: Page 2, first column, line 2, for "185°C." read 180°C.; and that the said Letters Patent should be read with this correction therein that the same may conform to the record of the case in the Patent Office.

Signed and sealed this 20th day of December, A. D. 1938.

Henry Van Arsdale (Seal) Acting Commissioner of Patents.